(12) United States Patent
Takesue et al.

(10) Patent No.: US 7,091,269 B2
(45) Date of Patent: Aug. 15, 2006

(54) GOLF BALL

(75) Inventors: Rinya Takesue, Chichibu (JP); Hiroyuki Nagasawa, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 49 days.

(21) Appl. No.: 10/864,362

(22) Filed: Jun. 10, 2004

(65) Prior Publication Data
US 2005/0020783 A1    Jan. 27, 2005

(30) Foreign Application Priority Data
Jun. 26, 2003   (JP) .............................. 2003-182754

(51) Int. Cl.
*A63B 37/12* (2006.01)
*A63B 37/00* (2006.01)

(52) U.S. Cl. ...................... 524/322; 524/394; 525/89; 525/92 A; 525/92 C; 525/92 F; 525/93; 473/373; 473/378; 473/385

(58) Field of Classification Search ................ None
See application file for complete search history.

(56) References Cited

U.S. PATENT DOCUMENTS

| 4,337,947 A | 7/1982 | Saito et al. |
| 4,919,434 A | 4/1990 | Saito |
| 6,251,030 B1 * | 6/2001 | Kato et al. .................. 473/365 |
| 6,653,402 B1 | 11/2003 | Ichikawa et al. |
| 2003/0022735 A1 * | 1/2003 | Hayashi et al. ............. 473/377 |

FOREIGN PATENT DOCUMENTS

| JP | 56-83367 A | 7/1981 |
| JP | 62-275480 A | 11/1987 |
| JP | 9-176429 A | 7/1997 |
| JP | 2002-356608 A | 12/2002 |

* cited by examiner

*Primary Examiner*—David J. Buttner
(74) *Attorney, Agent, or Firm*—Sughrue Mion, PLLC

(57) ABSTRACT

In a golf ball comprising a core and a cover of one or more layers, at least one layer of the cover is formed primarily of a mixture comprising (A) an ionomer resin, (B) a thermoplastic elastomer and (C) a thermoplastic block copolymer terminated with a functional group capable of reacting with the ionomer resin, in such a proportion as to provide a A/(B+C) weight ratio between 50/50 and 98/2 and a B/C weight ratio between 9/1 and 1/1. The golf ball has improved rebound, a soft feel upon impact, good durability and good moldability.

5 Claims, No Drawings

GOLF BALL

This invention relates to a golf ball featuring a soft feel upon impact, favorable rebound, good durability and good moldability.

BACKGROUND OF THE INVENTION

In the prior art, thermoplastic elastomers as typified by polyester elastomers, thermoplastic block copolymers and thermoplastic polyurethane have a relatively good resilience despite a low hardness and are widely used in the manufacturing of golf balls. However, these thermoplastic elastomers tend to lower rebound resilience, strength, impact resistance and low-temperature performance when they are tailored to a higher hardness.

On the other hand, ionomer resins in the form of copolymers of α-olefin with α,β-unsaturated carboxylic acids, neutralized with mono- to trivalent metal ions, are very tough and fully resistant to rupture even when undergoing substantial deformation at a high speed. Additionally, the ionomer resins are thermoplastic and easy to mold and work. On use as the cover stock for golf balls, this feature is very advantageous in improving the scuff resistance and durability against repetitive hits of golf balls. However, ionomer resins are short of flexibility and likely to give a hard feel upon impact.

An attempt was made to prepare golf balls from resin compositions in which thermoplastic elastomers are mixed with ionomer resins to compensate for the drawbacks of the respective components. For example, JP-A 56-83367 and JP-A 62-275480 disclose golf balls using resin compositions comprising polyester elastomers in admixture with ionomer resins. Since polyester block copolymers having flexibility and resilience are mixed with ionomer resins having toughness and a high modulus of resilience, the resulting mixtures make use of the advantages of the respective components and are golf ball-forming materials having improved rebound performance.

However, since polyester elastomers and ionomer resins are not so compatible when mixed together, the golf ball-forming resin compositions proposed in the above patent references have uneven morphology. They suffer from the problem that since the respective resins are readily oriented during injection molding, the molded parts are likely to delaminate and less durable against repetitive hits.

To improve the compatibility between ionomer resins and polyester elastomers, resin compositions comprising, in admixture, an ionomer resin, a polyester block copolymer and an epoxy-containing resin were proposed as golf ball-forming materials (see JP-A 9-176429 and JP-A 2002-356608). Since the compatibility between ionomer resin and polyester block copolymer is improved by the inclusion of an epoxy-containing resin, these resin compositions are golf ball-forming resin compositions having some delamination resistance, good flexibility and a high modulus of resilience. There is still left a room for further improvement in compatibility. The inclusion of an epoxy-containing resin can increase the melt viscosity of the resin composition. A high melt viscosity is advantageous for extrusion molding and blow molding, but inadequate for injection molding. The resin compositions are thus rather disadvantageous because injection molding is generally employed for golf balls.

It would be desirable to manufacture a golf ball featuring improved rebound, a soft feel upon impact, good durability and good moldability, using a golf ball-forming material which has advantages of both an ionomer resin and a thermoplastic elastomer, flexibility, rebound, toughness, flexural fatigue resistance, and tear strength, exhibits a sufficiently smooth flow in the melt to injection mold, and is free of delamination in molded form.

SUMMARY OF THE INVENTION

An object of the present invention is to provide a golf ball having improved rebound, a soft feel upon impact, good durability and good moldability.

The inventor has found that a mixture comprising (A) an ionomer resin composition, (B) a thermoplastic elastomer selected from a thermoplastic polyester elastomer, thermoplastic block copolymer and thermoplastic polyurethane, and (C) a thermoplastic block copolymer terminated with a functional group capable of reacting with the ionomer resin, in a specific proportion is a golf ball-forming material which has advantages of both the ionomer resin and the thermoplastic elastomer, flexibility, rebound, toughness, flexural fatigue resistance, and tear strength, exhibits a sufficiently smooth flow in the melt to injection mold, and is free of delamination in molded form; and that a golf ball comprising a core and a cover of one or more layers in which at least one layer of the cover is formed primarily of the above mixture has improved rebound, a soft feel upon impact, good durability and good moldability.

According to the present invention, there is provided a golf ball comprising a core and a cover of one or more layers enclosing the core. At least one layer which constitutes said cover is formed primarily of a mixture comprising (A) an ionomer resin composition, (B) a thermoplastic elastomer selected from a thermoplastic polyester elastomer, thermoplastic block copolymer and thermoplastic polyurethane, and (C) a thermoplastic block copolymer terminated with a functional group capable of reacting with the ionomer resin, in such a proportion as to provide a A/(B+C) weight ratio between 50/50 and 98/2 and a B/C weight ratio between 9/1 and 1/1.

The mixture may further comprise (D) an inorganic filler having no reactivity with the ionomer resin in such a proportion as to provide a (A+B+C)/D weight ratio between 100/10 and 100/30. Also the mixture may further comprise (E) an organic acid of 18 to 40 carbon atoms or a derivative thereof and (F) another inorganic filler capable of reacting with acid groups in component (A) and/or (E) in such a proportion as to provide a (A+B+C)/E weight ratio between 100/5 and 100/20 and a (A+B+C)/F weight ratio between 100/0.1 and 100/10.

In one embodiment, a cover outermost layer is formed primarily of the above-described mixture. In another embodiment, the cover consists of a plurality of layers, at least one layer other than a cover outermost layer is formed primarily of the above-described mixture.

DESCRIPTION OF THE PREFERRED EMBODIMENTS

The golf ball of the invention comprises a core and a cover of one or more layers enclosing the core. At least one layer which constitutes the cover is formed primarily of a mixture comprising (A) an ionomer resin composition, (B) a thermoplastic elastomer selected from a thermoplastic polyester elastomer, thermoplastic block copolymer and thermoplastic polyurethane, and (C) a thermoplastic block copolymer terminated with a functional group capable of reacting with the ionomer resin, in such a proportion as to provide a A/(B+C) weight ratio between 50/50 and 98/2 and a B/C weight ratio between 9/1 and 1/1. As used herein, the phrase "a layer is formed primarily of a mixture" means that the mixture of components (A) to (C) accounts for at least 50% by weight of the material of which that layer is made. Components (A) to (C) are described in detail.

Component A

Component (A) is an ionomer resin selected from among (a-1) an olefin-unsaturated carboxylic acid random copolymer, (a-2) a metal ion-neutralized product of an olefin-unsaturated carboxylic acid random copolymer, (a-3) an olefin-unsaturated carboxylic acid-unsaturated carboxylic acid ester random copolymer, (a-4) a metal ion-neutralized product of an olefin-unsaturated carboxylic acid-unsaturated carboxylic acid ester random copolymer, and mixtures thereof.

It is appreciated that either component (a-2) or (a-4) is essentially included in component (A).

As the olefin included in components (a-1) to (a-4), α-olefins are preferred. Preferred α-olefins are those of at least 2 carbon atoms and up to 8, preferably up to 6 carbon atoms. Examples of the α-olefin include ethylene, propylene, butene, pentene, hexene, heptene and octene. Of these, ethylene is most preferred. A mixture of such olefins is also useful.

As the unsaturated carboxylic acid included in components (a-1) to (a-4), α,β-unsaturated carboxylic acids having 3 to 8 carbon atoms are preferred. Examples include acrylic acid, methacrylic acid, maleic acid and fumaric acid. Of these, acrylic acid and methacrylic acid are preferably used. A mixture of such unsaturated carboxylic acids is also useful.

It is recommended for components (a-1) to (a-4) that the content of unsaturated carboxylic acid (sometimes referred to as acid content) be controlled. The content of unsaturated carboxylic acid in component (a-1) or (a-2) is typically at least 4 wt %, preferably at least 6 wt %, more preferably at least 8 wt %, most preferably at least 10 wt %, and as the upper limit, typically up to 30 wt %, preferably up to 20 wt %, more preferably up to 18 wt %, most preferably up to 15 wt %. Too low an unsaturated carboxylic acid content may provide a lower rigidity and resilience, resulting in a golf ball with lower flight performance. On the other hand, too high an unsaturated carboxylic acid content may lead to insufficient flexibility. The content of unsaturated carboxylic acid in component (a-3) or (a-4) is typically at least 4 wt %, preferably at least 6 wt %, more preferably at least 8 wt %, and as the upper limit, typically up to 15 wt %, preferably up to 12 wt %, more preferably up to 10 wt %. Too low an unsaturated carboxylic acid content may fail to achieve a flexibilizing effect whereas too high an unsaturated carboxylic acid content may lead to a loss of resilience.

The unsaturated carboxylic esters included in components (a-3) and (a-4) are preferably lower alkyl esters of the above-mentioned unsaturated carboxylic acids. Examples include those esters prepared by reacting the unsaturated carboxylic acids with lower alcohols such as methanol, ethanol, propanol, n-butanol and isobutanol. Of these, acrylates and methacrylates are preferred. Specific examples include methyl methacrylate, ethyl methacrylate, propyl methacrylate, butyl methacrylate, methyl acrylate, ethyl acrylate, propyl acrylate, butyl acrylate, etc. Inter alia, butyl acrylate (n-butyl acrylate or isobutyl acrylate) is preferred. A mixture of such unsaturated carboxylic esters is also useful.

Components (a-1) and (a-3), which are collectively referred to as "random copolymers," hereinafter, are obtainable by mixing desired amounts of the respective reactants and effecting random copolymerization in a well-known manner.

Components (a-2) and (a-4), which are collectively referred to as "metal ion-neutralized random copolymers," hereinafter, are obtainable by neutralizing acid groups in the random copolymers with metal ions. Examples of metal ions that may be used to neutralize acid groups include $Na^+$, $K^+$, $Li^+$, $Zn^{2+}$, $Cu^{2+}$, $Mg^{2+}$, $Ca^{2+}$, $Co^{2+}$, $Ni^{2+}$, and $Pb^{2+}$. Of these $Li^+$, $Na^+$, $Mg^{2+}$, $Ca^{2+}$ and $Zn^{2+}$ are especially preferred. For neutralization, there may be used compounds of the foregoing metal ions, such as formates, acetates, nitrates, carbonates, bicarbonates, oxides, hydroxides and alkoxides.

It is recommended from the standpoint of facilitating resin mixing and molding without sacrificing the resilience of the cover that in the metal ion-neutralized random copolymer, the degree of neutralization be at least 10 mol %, preferably at least 20 mol %, more preferably at least 30 mol %, and as the upper limit, up to 80 mol % and preferably up to 70 mol %, based on the carboxylic acid groups in the copolymer.

Component B

Component (B) is a thermoplastic elastomer which is (b-1) a thermoplastic polyester elastomer, (b-2) a thermoplastic block copolymer or (b-3) a thermoplastic polyurethane.

The thermoplastic polyester elastomer (b-1) is not critical as long as it is a polyester base thermoplastic elastomer. Use is preferably made of a polyester base block copolymer composed primarily of high-melting crystalline polymer segments made of crystalline aromatic polyester units and low-melting polymer segments made of aliphatic polyether units and/or aliphatic polyester units.

Preferred examples of the high-melting crystalline polymer segments made of crystalline aromatic polyester units include polybutylene terephthalate derived from terephthalic acid and/or dimethyl terephthalate in combination with 1,4-butanediol. Other suitable, non-limiting, examples include polyesters derived from a dicarboxylic acid component such as orthophthalic acid, isophthalic acid, terephthalic acid, naphthalene-2,6-dicarboxylic acid, naphthalene-2,7-dicarboxylic acid, diphenyl-4,4'-dicarboxylic acid, diphenoxyethanedicarboxylic acid, 5-sulfoisophthalic acid or an ester-forming derivative thereof in combination with a diol having a molecular weight of up to 300, such as an aliphatic diol (e.g., ethylene glycol, trimethylene glycol, 1,4-butanediol, pentamethylene glycol, hexamethylene glycol, neopentyl glycol, decamethylene glycol), an alicyclic diol (e.g., 1,4-cyclohexanedimethanol, tricyclodecanedimethylol), or an aromatic diol (e.g., xylylene glycol, bis(p-hydroxy)diphenyl, bis(p-hydroxyphenyl)propane, 2,2-bis[4-(2-hydroxyethoxy)phenyl]propane, bis[4-(2-hydroxy)phenyl]sulfone, 1,1-bis[4-(2-hydroxyethoxy)phenyl]cyclohexane, 4,4'-dihydroxy-p-terphenyl and 4,4'-dihydroxy-p-quarterphenyl). Use can also be made of copolymeric polyesters obtained using two or more of these dicarboxylic acid components and diol components. In addition, polycarboxylic acid components, polyoxy components and polyhydroxy components having a functionality of three or more can be copolymerized therein within a range of up to 5 mol %.

In the low-melting polymer segments made of aliphatic polyether units and/or aliphatic polyester units, illustrative examples of the aliphatic polyether include poly(ethylene oxide)glycol, poly(propylene oxide)glycol, poly(tetramethylene oxide)glycol, poly(hexamethylene oxide)glycol, copolymers of ethylene oxide and propylene oxide, ethylene oxide addition polymers of poly(propylene oxide)glycols, and copolymers of ethylene oxide and tetrahydrofuran. Illustrative examples of the aliphatic polyester include poly (ε-caprolactone), polyenantholactone, polycaprylolactone, poly(butylene adipate) and poly(ethylene adipate). As long as the elastic properties of the resultant polyester block copolymer are concerned, poly(tetramethylene oxide)glycol, ethylene oxide addition polymers of poly(propylene oxide) glycols, poly(ε-caprolactone), poly(butylene adipate) and poly(ethylene adipate) are preferred, with poly(tetramethylene oxide)glycol being most preferred.

The low-melting polymer segments preferably have a number average molecular weight in the copolymerized state of about 300 to 6,000. It is noted that the "number average molecular weight" as used herein is computed from GPC measurements using polystyrene standards.

In cases where the thermoplastic polyester elastomer used as component (b-1) is composed primarily of high-melting crystalline polymer segments made of crystalline aromatic polyester units and low-melting polymer segments made of aliphatic polyether units and/or aliphatic polyester units, it is advantageous to adjust the amounts of high-melting crystalline polymer segments and low-melting polymer segments such that the weight ratio of high-melting crystalline polymer segments to low-melting polymer segments is between 85/15 and 10/90, preferably between 85/15 and 50/50. If the proportion of low-melting polymer segments is too high, the thermoplastic polyester elastomer may have inadequate melt characteristics for injection molding, which can make it difficult to achieve uniform mixture during melt blending with other components. On the other hand, if the proportion is too low, sufficient flexibility and resilience may not be achieved.

The total amount of high-melting crystalline polymer segments and low-melting polymer segments is typically at least 50 wt %, preferably at least 70 wt %, more preferably at least 90 wt % of the thermoplastic polyester elastomer.

It is not critical how to prepare component (b-1). Any well-known method may be used. Exemplary are methods (i) to (v) described below, any of which may be advantageously employed to prepare the thermoplastic polyester elastomer.

(i) Method of effecting transesterification of a low alcohol diester of dicarboxylic acid, an excess of a low molecular weight glycol, and a low-melting polymer segment component in the presence of a catalyst, followed by polycondensation of the reaction product.

(ii) Method of effecting esterification of a dicarboxylic acid, an excess of a glycol, and a low-melting polymer segment component in the presence of a catalyst, followed by polycondensation of the reaction product.

(iii) Method of preforming a high-melting crystalline segment, adding a low-melting segment component thereto, and effecting transesterification for randomization.

(iv) Method of linking a high-melting crystalline segment to a low-melting polymer segment using a concatenating agent.

(v) Method of effecting addition of ε-caprolactone monomer to a high-melting crystalline segment when poly(ε-caprolactone) is used as the low-melting polymer segment.

With respect to the hardness of component (b-1), it is recommended from the standpoint of golf ball feel improvement, though not critical, that component (b-1) have a Shore D hardness of typically at least 10, preferably at least 20, and as the upper limit, up to 50, especially up to 40, as measured according to ASTM D-2240. It is recommended from the standpoint of golf ball feel improvement that component (b-1) have a lower hardness (i.e., be more flexible) than the ionomer resin composition (A).

Though not critical, it is also preferred that component (b-1) exhibit a high rebound resilience, typically of at least 40%, preferably at least 50%, and as the upper limit, typically up to 90%, as measured according to the BS Standard 903. If the rebound resilience of component (b-1) is too low, rebound may be compromised so that the golf ball sometimes degrades its flight performance.

Though not critical, it is further preferred that component (b-1) have a relatively low flexural modulus, typically of at least 5 MPa, preferably at least 10 MPa, more preferably at least 15 MPa, and as the upper limit, up to 250 MPa, preferably up to 200 MPa, more preferably up to 150 MPa, as measured according to JIS K-7106. If the flexural modulus is too high, the golf ball may sometimes degrade its feel on impact and durability.

Suitable examples of the thermoplastic block copolymer (b-2) include those composed of crystalline polyethylene blocks (C) and/or crystalline polystyrene blocks (S) as hard segments and polybutadiene blocks (B), polyisoprene blocks (I), relatively random copolymer structure blocks (EB) of ethylene and butylene, and/or relatively random copolymer structure blocks (EP) of ethylene and propylene as soft segments. Preferred soft segments are EB and/or EP, with EB being most preferred.

Suitable examples of component (b-2) include, but are not limited to, S-EB-S, S-B-S, S-I-S, S-EB, S-EB-S-EB, S-EP-S, S-EB-C, S-B-C, S-I-C, S-EP-C, C-EB-C, C-B-C, C-I-C, C-EB, C-EB-C-EB, C-EP-C, etc. The inclusion of crystalline polyethylene blocks (C) in the hard segments is preferred for resilience. Of these structures, S-EP-C and C-EB-C are preferred.

When component (b-2) is a thermoplastic block copolymer of C-EB-C or S-EB-C type, it can be obtained, for example, by hydrogenating butadiene or a styrene-butadiene copolymer. The polybutadiene or styrene-butadiene copolymer used in hydrogenation is preferably a polybutadiene in which the butadiene structure contains 1,4 polymer blocks which are at least 95 wt % composed of 1,4 units, and the overall butadiene structure has a 1,4 unit content of at least 50 wt %, and more preferably at least 80 wt %. The degree of hydrogenation in the hydrogenation product, expressed as the percent of double bonds in the polybutadiene or styrene-butadiene copolymer that are converted to saturated bonds, is preferably 60 to 100%, and more preferably 90 to 100%. Too low a degree of hydrogenation may lead to deterioration such as gelation in the blending step with the ionomer resin or the like, and cause problems of weatherability and impact durability to the cover in the completed golf ball.

In component (b-2), the hard segment content is preferably 10 to 50% by weight. A hard segment content which is too high may result in so low a flexibility as to keep the objects of the invention from being effectively achieved, whereas a hard segment content which is too low may give rise to problems in molding of the blend.

Preferably component (b-2) has a number average molecular weight of about 30,000 to 800,000. Component (b-2) has a melt index at 230° C. of preferably 0.5 to 15 g/10 min, and more preferably 1 to 7 g/10 min, as measured under a test load of 21.2 N (2.16 kgf) according to JIS K-6760. Outside the range, problems such as weld lines, sink marks and short shots may arise during injection molding.

It is also preferred from the standpoint of providing a mixture with an appropriate melt viscosity that component (b-2) be free of a functional group capable of reacting with the ionomer resin.

The thermoplastic polyurethane (b-3) is preferably composed of a polymeric polyol compound to constitute soft segments, a monomolecular chain extender to constitute hard segments, and a diisocyanate.

The polymeric polyol used herein, though not particularly limited, may be selected from polyester base polyols, polyol base polyols, polyether base polyols, copolyester base polyols, and polycarbonate base polyols. Illustrative, non-limiting examples of the polyester base polyols include polycaprolactone glycol, poly(ethylene-1,4-adipate)glycol and poly(butylene-1,4-adipate)glycol; an exemplary copolyester base polyol is poly(diethylene glycol adipate)glycol; an exemplary polycarbonate base polyol is poly(hexane diol-1,6-carbonate)glycol; and an exemplary polyether base polyol is polyoxytetramethylene glycol. The polymeric polyol typically has a number average molecular weight of about 600 to 5,000, preferably about 1,000 to 3,000.

Preferred diisocyanates are aliphatic and aromatic diisocyanates which are typical when polyurethane is used as the golf ball cover stock. Specific examples include hexamethylene diisocyanate (HDI), 2,2,4- or 2,4,4-trimethylhexamethylene diisocyanate (TMDI), lysine diisocyanate (LDI), tolylene diisocyanate (TDI), and diphenylmethane diisocyanate (MDI). Of these, hexamethylene diisocyanate (HDI) and diphenylmethane diisocyanate (MDI) are preferred for compatibility with other resins upon blending.

The monomolecular chain extender used herein is not particularly limited and may be selected from commonly used polyhydric alcohols and amines. Specific examples include 1,4-butylene glycol, 1,2-ethylene glycol, 1,3-propylene glycol, 1,6-hexylene glycol, 1,3-butylene glycol, dicyclohexylmethyl methane diamine (hydrogenated MDI) and isophorone diamine (IPDA).

With respect to the hardness of component (b-3), component (b-3) typically has a JIS-A hardness of 70 to 100, preferably 80 to 98, more preferably 90 to 99, even more preferably 95 to 98, as measured according to JIS K-6301. If the JIS-A hardness is less than 70, the spin rate when hit with a driver may be excessively increased, resulting in a reduced carry.

Also, component (b-3) typically has a specific gravity of 1.0 to 1.3 (g/cm$^3$), more preferably 1.1 to 1.25 (g/cm$^3$).

Commercial products may be suitably used as component (b-3). Illustrative examples include Pandex T-R3080, T7298, EX7895, T7890 and T8198 manufactured by DIC Bayer Polymer Co., Ltd.

Component C

Component (C) is a thermoplastic block copolymer terminated with a functional group capable of reacting with the ionomer resin. The thermoplastic block copolymer as the base resin of component (C) is preferably a copolymer comprising soft and hard segments. Preferred are block copolymers of the type H1-S1, H1-S1-H1-S1, H1-(S1-H1)n-S1, and H1-S1-H2 wherein H1 and H2 stand for hard segments and S1 stands for a soft segment. Of these, diblock copolymers of the type H1-S1 and triblock copolymers of the type H1-S1-H2 are more preferred, with the triblock copolymers of the type H1-S1-H2 being most preferred. The use of these copolymers achieves a significant improvement in compatibility with other resin components in the cover material, as compared with other block copolymers, graft copolymers and random copolymers.

The hard segments in the thermoplastic block copolymer as the base resin of component (C) include crystalline olefin blocks, vinyl aromatic compounds, polyester blocks, polyamide blocks and the like. Compatibility is effectively improved particularly when crystalline olefin blocks, vinyl aromatic compounds, and polyester blocks are used, and more preferably when crystalline olefin blocks and vinyl aromatic compounds are used. Examples of the crystalline olefin blocks include crystalline ethylene blocks (C) and crystalline propylene blocks, with the crystalline ethylene blocks being preferred. It is preferred to use styrene blocks (S) as the vinyl aromatic compound blocks, polytetramethylene terephthalate blocks (PBT) as the polyester blocks, and nylon blocks as the polyamide blocks.

The soft segments in the thermoplastic block copolymer as the base resin of component (C) include polybutadiene blocks (B), polyisoprene blocks (I), relatively random copolymer structure blocks (EB) of ethylene and butylene, and relatively random copolymer structure blocks (EP) of ethylene and propylene, preferably relatively random copolymer structure blocks (EB) of ethylene and butylene and relatively random copolymer structure blocks (EP) of ethylene and propylene, and more preferably relatively random copolymer structure blocks (EB) of ethylene and butylene.

Specifically, the thermoplastic block copolymer as the base resin of component (C) is preferably a thermoplastic block copolymer having both end blocks of different comonomers. Illustrative structures include S-EB-C, S-B-C, S-I-C, S-EB, S-EB-S-EB, S-EP-C, PBT-S-EB, and PBT-S-EB-C. For an effective improvement in compatibility between ionomer resin and thermoplastic elastomer, S-EB-C and PBT-S-EB are preferred, with S-EB-C being most preferred.

A block copolymer of S-EB-C type as the base resin of component (C) can be obtained, for example, by hydrogenating a styrene-butadiene copolymer. The styrene-butadiene copolymer used in hydrogenation is preferably a polybutadiene in which the butadiene structure contains 1,4 polymer blocks which are at least 95 wt % composed of 1,4 units, and the overall butadiene structure has a 1,4 unit content of at least 50 wt %, and more preferably at least 80 wt %. The degree of hydrogenation in the hydrogenated styrene-butadiene copolymer, expressed as the percent of double bonds in the styrene-butadiene copolymer that are converted to saturated bonds, is preferably 60 to 100%, and more preferably 90 to 100%. Too low a degree of hydrogenation may lead to deterioration such as gelation in the blending step with the ionomer resin or the like, and cause problems of weatherability and impact durability to the cover in the completed golf ball.

In the thermoplastic block copolymer comprising soft and hard segments as the base resin of component (C), the hard segment content is preferably 10 to 50% by weight of the block copolymer. A hard segment content which is too high may result in so low a flexibility as to keep the objects of the invention from being effectively achieved, whereas a hard segment content which is too low may give rise to problems in molding of the blend.

Preferably the thermoplastic block copolymer as the base resin of component (C) has a number average molecular weight of about 30,000 to 800,000. The thermoplastic block copolymer typically has a melt index at 230° C. of 0.5 to 15 g/10 min, and preferably 1 to 7 g/10 min as measured under a test load of 21.2 N (2.16 kgf) according to JIS K-6760. Outside the range, problems such as weld lines, sink marks and short shots may arise during injection molding.

The thermoplastic block copolymer terminated with a functional group capable of reacting with the ionomer resin (C) is preferably a thermoplastic block copolymer in which only end blocks are modified with functional groups. The only terminally modified block copolymer effectively achieves an improvement in compatibility, as compared with block copolymers in which only intermediate blocks are modified or both intermediate blocks and end blocks are modified, or random copolymers which are modified throughout their molecule. The modification of only molecular ends eliminates a possibility that when mixed with component (A), more than necessity functional groups react with the ionomer resin to increase the viscosity of the mixture, and ensures that the thermoplastic block copolymer bonds at its molecular chain ends with the ionomer resin to achieve a more effective improvement in compatibility.

In the thermoplastic block copolymer terminated with a functional group capable of reacting with the ionomer resin (C), the functional group capable of reacting with the ionomer resin is preferably a group having moderate reactivity because a group having high reactivity invites a viscosity lowering and a group having low reactivity is less effective for compatibility improvement. Such functional groups include amino, acid anhydride and epoxy groups, when listed in a descending order of preference.

In the golf ball of the invention, at least one layer which constitutes the cover is formed primarily of a mixture comprising the above-described components (A), (B) and (C) in such a proportion as to provide a A/(B+C) weight ratio between 50/50 and 98/2 and a B/C weight ratio between 9/1 and 1/1. The compounding proportion of components (A) to (C) is further described below.

In one embodiment wherein the mixture is used to form a layer of the golf ball cover other than the outermost layer, the A/(B+C) weight ratio is preferably between 50/50 and 90/10, more preferably between 60/40 and 80/20; and the B/C weight ratio is preferably between 9/1 and 1/1, more preferably between 6/1 and 2/1.

In another embodiment wherein the mixture is used to form the outermost layer of the golf ball cover, the A/(B+C) weight ratio is preferably between 70/30 and 98/2, more preferably between 80/20 and 96/4; and the B/C weight ratio is preferably between 9/1 and 1/1, more preferably between 6/1 and 2/1.

While the golf ball of the invention has at least one layer of the cover formed primarily of a mixture comprising components (A) to (C) in a specific proportion, the mixture of components (A) to (C) constitutes at least 50% by weight, preferably at least 70% by weight, and even 100% by weight, but preferably up to 90% by weight, more preferably up to 80% by weight, based on the cover layer. If the mixture of components (A) to (C) constitutes less than 50% by weight of the cover layer, the layer becomes less resilient, failing to attain the object of the invention.

In addition to components (A) to (C), the mixture used herein may further contain (D) an inorganic filler having no reactivity with the ionomer resin, (E) an organic acid of 18 to 40 carbon atoms or a derivative thereof, and (F) another inorganic filler capable of reacting with acid groups in component (A) and/or (E).

Component D

Component (D) is an inorganic filler having no reactivity with the ionomer resin, which is compounded for adjusting the specific gravity of the mixture and improving the durability of the golf ball cover. The phrase "having no reactivity with the ionomer resin" means that when the inorganic filler and the ionomer resin are melt mixed, neither foaming nor a substantial viscosity buildup occurs. For example, an inorganic filler is determined as having no reactivity, when it clears the following test. Namely, when the inorganic filler is added in an amount as used in the invention to a typical ionomer resin, Himilan 1605, and mixed at 200° C. for 5 minutes, no foaming occurs and the resulting mixture has a melt index of at least 1 (as measured at 190° C. and a test load of 21.2 N).

Examples of component (D) include barium sulfate, titanium dioxide and hard clay. Inter alia, barium sulfate is preferred. Of the barium sulfate species, precipitated barium sulfate is preferred since it has a consistent particle size.

From the standpoint of improving the durability of the composition, component (D) has an average particle size of typically at least 0.01 µm, preferably at least 0.05 µm, more preferably at least 0.1 µm, and as the upper limit, typically up to 5 µm, preferably up to 3 µm, more preferably up to 1

From the standpoint of adjusting the specific gravity of the mixture, component (D) has a specific gravity of typically at least 2, preferably at least 4, and as the upper limit, typically up to 7, preferably up to 5.

Component E

Component (E) is an organic acid of 18 to 40 carbon atoms or a derivative thereof. Fatty acids having a molecular weight of 280 to 1,500 or derivatives thereof are preferred. Component (E) has an extremely low molecular weight as compared with the resins used as components (A) to (C) and is effective for adjusting the melt viscosity of the mixture of components (A) to (C) to an appropriate level and especially helps improve flow. Owing to a relatively high content of acid groups (or derivatives), component (E) is effective for preventing an excessive loss of resilience.

Component (E) has a molecular weight of typically at least 280, preferably at least 300, more preferably at least 330, even more preferably at least 360, and as the upper limit, typically up to 1,500, preferably up to 1,000, more preferably up to 600, even more preferably up to 500. Too low a molecular weight may fail to improve heat resistance whereas too high a molecular weight may fail to improve flow.

Preferred examples of component (E) include unsaturated fatty acids having a double bond or triple bond on the alkyl moiety, saturated fatty acids in which all the bonds on the alkyl moiety are single bonds, and derivatives thereof. It is recommended that the number of carbons on the fatty acid molecule be typically at least 18, preferably at least 20, more preferably at least 22, and most preferably at least 24, and as the upper limit, up to 80, preferably up to 60, more preferably up to 40, and most preferably up to 30. Too few carbons may fail to improve heat resistance and may also make the content of acid groups relatively high so as to diminish the flow-enhancing effect on account of interactions with acid groups in the base resin. On the other hand, too many carbons increases the molecular weight, which may prevent the significant flow-enhancing effect from being achieved.

Specific examples of organic acids of 18 to 40 carbons that can be used as component (E) include stearic acid, 12-hydroxystearic acid, behenic acid, oleic acid, linoleic acid, linolenic acid, arachidic acid and lignoceric acid. Of these, stearic acid, arachidic acid, behenic acid and lignoceric acid are preferred. Behenic acid is especially preferred.

Organic acid derivatives of 18 to 40 carbons which can be used as component (E) include metallic soaps in which the proton on the acid group of the above organic acid is substituted with a metal ion. Metal ions that may be used in such metallic soaps include $Na^+$, $Li^+$, $Ca^{2+}$, $Mg^{2+}$, $Zn^{2+}$, $Mn^{2+}$, $Al^{3+}$, $Ni^{2+}$, $Fe^{2+}$, $Fe^{3+}$, $Cu^{2+}$, $Sn^{2+}$, $Pb^{2+}$ and $Co^{2+}$. Of these, $Ca^{2+}$, $Mg^{2+}$ and $Zn^{2+}$ are preferred.

Specific examples of organic acid derivatives that can be used as component (E) include magnesium stearate, calcium stearate, zinc stearate, magnesium 12-hydroxystearate, calcium 12-hydroxystearate, zinc 12-hydroxystearate, magnesium arachidate, calcium arachidate, zinc arachidate, magnesium behenate, calcium behenate, zinc behenate, magnesium lignocerate, calcium lignocerate and zinc lignocerate. Of these, magnesium stearate, calcium stearate, zinc stearate, magnesium arachidate, calcium arachidate, zinc arachidate, magnesium behenate, calcium behenate, zinc behenate, magnesium lignocerate, calcium lignocerate and zinc lignocerate are preferred.

Component F

Component (F) is another inorganic filler capable of reacting with acid groups in component (A) and/or (E), which is compounded for improving rebound. Examples of component (F) include inorganic compounds containing $Li^+$, $Na^+$, $K^+$, $Ca^{2+}$, $Mg^{2+}$, $Zn^{2+}$, $Al^{3+}$, $Ni^{2+}$, $Fe^{2+}$, $Fe^{3+}$, $Cu^{2+}$, $Mn^{2+}$, $Sn^{2+}$, $Pb^{2+}$, and $Co^{2+}$. Specific examples include magnesium oxide, magnesium hydroxide, magnesium carbonate, zinc oxide, sodium hydroxide, sodium carbonate, calcium oxide, calcium hydroxide, lithium hydroxide, and lithium carbonate. These compounds may be used alone or in admixture of any. Of these, hydroxides and monoxides are preferred. Inter alia, calcium hydroxide and magnesium oxide which are highly reactive with the base resin are recommended, with calcium hydroxide being especially preferred.

Optionally one or more of components (D) to (F) are incorporated in the mixture comprising components (A) to (C) in a specific proportion of which is primarily formed at least one layer of the golf ball cover.

In the embodiment wherein component (D) is used in combination with components (A) to (C), the compounding proportion is, though not critical, such that component (D) is present in an amount of typically at least 10 pbw, preferably at least 15 pbw, and as the upper limit, typically up to 30 pbw, preferably up to 25 pbw, per 100 pbw of the total of components (A) to (C). If the amount of component (D) is less than 10 pbw per 100 pbw of the total of components (A) to (C), durability may not be improved. If the amount of component (D) is more than 30 pbw, a loss of resilience may occur. It is noted that "pbw" is parts by weight.

In the embodiment wherein components (E) and (F) are used in combination with components (A) to (C), their compounding proportion is set as follows. In the event where the mixture of these components is used to form a layer of the golf ball cover other than the outermost layer, component (E) is present in an amount of typically at least 5 pbw, preferably at least 10 pbw, more preferably at least 12 pbw, and as the upper limit, typically up to 20 pbw, preferably up to 16 pbw, per 100 pbw of the total of components (A) to (C). If the amount of component (E) is less than 5 pbw per 100 pbw of the total of components (A) to (C), flow may not be improved. If the amount of component (E) is more than 20 pbw, a loss of resilience may occur.

Similarly, component (F) is present in an amount of typically at least 0.1 pbw, preferably at least 1 pbw, more preferably at least 2 pbw, and as the upper limit, typically up to 10 pbw, preferably up to 8 pbw, more preferably up to 5 pbw, per 100 pbw of the total of components (A) to (C). If the amount of component (F) is less than 0.1 pbw per 100 pbw of the total of components (A) to (C), resilience may not be improved. If the amount of component (F) is more than 10 pbw, flow may lower.

When component (E) is a fatty acid, it is preferred that component (F) be added as a minimum requirement in an amount in excess of the amount necessary to neutralize the fatty acid to the entirety.

In the event where the mixture of these components is used to form the outermost layer of the golf ball cover, component (E) is present in an amount of typically at least 5 pbw, preferably at least 8 pbw, and as the upper limit, typically up to 15 pbw, preferably up to 12 pbw, per 100 pbw of the total of components (A) to (C). If the amount of component (E) is less than 5 pbw per 100 pbw of the total of components (A) to (C), flow may not be improved. If the amount of component (E) is more than 15 pbw, moldability may not be improved.

Similarly, component (F) is present in an amount of typically at least 0.3 pbw, preferably at least 0.5 pbw, and as the upper limit, typically up to 5 pbw, preferably up to 3 pbw, per 100 pbw of the total of components (A) to (C). If the amount of component (F) is less than 0.3 pbw per 100 pbw of the total of components (A) to (C), resilience may not be improved. If the amount of component (F) is more than 5 pbw, flow may lower.

Reference is now made to the embodiment wherein all components (D) to (F) are used in combination with components (A) to (C). In the event where the mixture of these components is used to form a layer of the golf ball cover other than the outermost layer, component (D) is present in an amount of at least 10 pbw, preferably at least 15 pbw, and as the upper limit, up to 30 pbw, preferably up to 25 pbw, per 100 pbw of the total of components (A) to (C). If the amount of component (D) is less than 10 pbw per 100 pbw of the total of components (A) to (C), durability may not be improved. If the amount of component (D) is more than 30 pbw, a loss of resilience may occur.

Component (E) is present in an amount of typically at least 5 pbw, preferably at least 10 pbw, more preferably at least 12 pbw, and as the upper limit, typically up to 20 pbw, preferably up to 16 pbw, per 100 pbw of the total of components (A) to (C). If the amount of component (E) is less than 5 pbw per 100 pbw of the total of components (A) to (C), flow may not be improved. If the amount of component (E) is more than 20 pbw, a loss of resilience may occur.

Similarly, component. (F) is present in an amount of typically at least 0.1 pbw, preferably at least 1 pbw, more preferably at least 2 pbw, and as the upper limit, typically up to 10 pbw, preferably up to 8 pbw, more preferably up to 5 pbw, per 100 pbw of the total of components (A) to (C). If the amount of component (F) is less than 0.1 pbw per 100 pbw of the total of components (A) to (C), resilience may not be improved. If the amount of component (F) is more than 10 pbw, flow may lower.

In the event where the mixture of these components is used to form the outermost layer of the golf ball cover, component (D) is present in an amount of at least 10 pbw, preferably at least 15 pbw, and as the upper limit, up to 30 pbw, preferably up to 25 pbw, per 100 pbw of the total of components (A) to (C). If the amount of component (D) is less than 10 pbw per 100 pbw of the total of components (A) to (C), durability may not be improved. If the amount of component (D) is more than 30 pbw, a loss of resilience may occur.

Component (E) is present in an amount of typically at least 5 pbw, preferably at least 8 pbw, and as the upper limit, typically up to 20 pbw, preferably up to 15 pbw, per 100 pbw of the total of components (A) to (C). If the amount of component (E) is less than 5 pbw per 100 pbw of the total of components (A) to (C), flow may not be improved. If the amount of component (E) is more than 20 pbw, moldability may not be improved.

Similarly, component (F) is present in an amount of typically at least 0.1 pbw, preferably at least 0.3 pbw, more preferably at least 0.5 pbw, and as the upper limit, typically up to 10 pbw, preferably up to 5 pbw, more preferably up to 3 pbw, per 100 pbw of the total of components (A) to (C). If the amount of component (F) is less than 0.1 pbw per 100 pbw of the total of components (A) to (C), resilience may not be improved. If the amount of component (F) is more than 5 pbw, flow may lower.

While at least one layer which constitutes the golf ball cover is formed primarily of a mixture comprising components (A) to (C) and optionally components (D) to (F) in a specific proportion according to the invention, various other additives such as pigments, dispersants, antioxidants, UV absorbers, photo-stabilizers and inorganic fillers may be added to the mixture, if necessary and as long as the object of the invention is not impaired. The amount of such additives used is, though not critical, typically 0.1 to 50 pbw, preferably 0.5 to 30 pbw, more preferably 1 to 6 pbw, per 100 pbw of the total of components (A) to (C). Excessive amounts of additives may have negative impact on durability whereas too less amounts of additives may fail to achieve their addition effect.

The cover material formed primarily of a mixture comprising components (A) to (C) in a specific proportion according to the invention, sometimes referred to as "inventive cover material," hereinafter, has a Shore D hardness of typically at least 40, preferably at least 45, and as the upper limit, typically up to 62, preferably up to 58. Too low a Shore D hardness may lead to poor resilience whereas too high a Shore D hardness may fail to improve feel on impact and controllability.

Also, the inventive cover material typically has a specific gravity of 0.85 to 1.2 g/cm$^3$, preferably 0.9 to 1.1 g/cm$^3$, more preferably 0.92 to 1.0 g/cm$^3$.

It is not critical how to prepare the inventive cover material. For example, the cover material can be prepared by kneading the components on a mixer, typically an internal mixer such as a kneader type twin-screw extruder, Banbury mixer or kneader.

Core

The core in the inventive golf ball may be either a thread-wound core or a solid core and may be produced by a conventional method.

For example, the solid core can be produced from a rubber composition comprising 100 parts by weight of cis-1,4-polybutadiene; from 10 to 60 parts by weight of one or more crosslinking or vulcanizing agents selected from among α,β-monoethylenically unsaturated carboxylic acids (e.g., acrylic acid, methacrylic acid) or metal ion-neutralized compounds thereof and functional monomers (e.g., trimethylolpropane methacrylate); from 5 to 30 parts by weight of a filler such as zinc oxide or barium sulfate; from 0.5 to 5 parts by weight of a peroxide such as dicumyl peroxide; and, if necessary, from 0.1 to 1 part by weight of an antioxidant. The rubber composition may be formed into a solid spherical core by press vulcanization to effect crosslinkage, followed by compression under heating at 140 to 170° C. for a period of 10 to 40 minutes.

In the case of a thread would golf ball, the wound core is prepared by first forming a liquid or solid center. The liquid center is arrived at by preforming a hollow spherical center bag from a rubber composition as described above, and filling the bag with a liquid in a well-known manner. The solid center can be prepared by the same method as described above for the preparation of the solid core. Rubber thread is wound around the center under tension, producing a core.

The rubber thread used herein may be routinely produced, for example, by compounding natural rubber or synthetic rubber (typically polyisoprene) with various additives such as an antioxidant, vulcanization accelerator and sulfur and molding and vulcanizing the resulting rubber composition.

The core may have a structure of a single layer or plural layers.

With respect to core surface hardness, the core typically has a JIS-C hardness of 60 to 85, preferably 65 to 83, more preferably 67 to 80, as measured according to JIS K-6301. Too high a core hardness may lead to too hard a feel on impact and too much a spin rate when hit with a driver (W#1). Too low a core hardness may lead to too soft a feel on impact, too low a resilience to provide a carry, and poor crack durability upon repeated impact.

The core typically has a diameter of at least 25 mm, preferably at least 36 mm, and as the upper limit, up to 40 mm, preferably up to 39 mm, more preferably up to 38 mm.

The golf ball of the invention is arrived at by enclosing the core with a cover including at least one layer formed of the inventive cover material. The layer formed of the inventive cover material may be part or the entirety of the cover. The golf balls of the invention may take any desired form including thread wound golf balls (in which the cover may be either a single layer or a multilayer structure of two or more layers), two-piece solid golf balls, three-piece solid golf balls, and multi-piece solid golf balls.

Well-known methods may be used in forming the cover. For example, a core is preformed in accordance with a particular type of golf ball. The core is placed in a mold, into which the inventive cover material after heating, mixing and melting is injected. Alternatively, the inventive cover material is preformed into a pair of hemispherical half-cups, and the core is encased in the half cups, followed by compression molding at 120 to 170° C. for 1 to 5 minutes.

Preferably the inventive cover material is adjusted to an appropriate melt index for providing an appropriate flow for injection molding and improving moldability. It is recommended that the inventive cover material be adjusted to a melt index (MI) as measured at a test temperature of 190° C. and a test load of 21.2 N (2.16 kgf) according to JIS K-6760 in a range of typically at least 0.5 dg/min, preferably at least 1 dg/min, more preferably at least 1.5 dg/min, even more preferably at least 2 dg/min, and as the upper limit, typically up to 20 dg/min, preferably up to 10 dg/min, more preferably up to 5 dg/min, even more preferably up to 3 dg/min. Too high or too low a melt index may substantially lower workability.

The cover formed of the inventive cover material typically has a gage of at least 0.5 mm, preferably at least 0.9 mm, more preferably at least 1.1 mm, and as the upper limit, up to 3 mm, preferably up to 2.5 mm, more preferably up to 2.0 mm. Too large a cover gage may lead to a loss of rebound whereas too small a cover gage may lead to a loss of durability.

The golf ball of the invention has numerous dimples formed on the surface of the cover outermost layer. The cover may be administered various treatment such as surface preparation, stamping and painting. In particular, the improved moldability of the cover surface ensures ease of work when a golf ball cover made of the inventive cover material is administered such surface treatment.

The "dimple volume occupancy," abbreviated below as VR and expressed in units of percent, is defined as the ratio of the total volume of dimples on the golf ball surface to the volume of a hypothetical golf ball without dimples. For shots taken with a driver (W#1), it is desirable for the golf ball of the invention to have a VR value of at least 0.66, preferably at least 0.70, and most preferably at least 0.75, but not more than 0.85, preferably not more than 0.82, and most preferably not more than 0.79. At too low a VR value, the ball tends to follow a skying arc and may not roll well on landing, resulting in a short total distance. On the other hand, at too high a VR value, the ball tends to have a less rising trajectory and thus a poor carry, resulting in a short total distance.

The golf ball of the invention may be manufactured for use in tournaments by giving it a diameter and weight which conform with the Rules of Golf (USGA). That is, the ball may be produced to a diameter of not less than 42.67 mm and preferably not more than 43.00 mm and a weight of not greater than 45.93 g and preferably not less than 44.6 g. The golf ball is also manufactured to an initial velocity of typically at least 76.4 m/s, preferably at least 76.6 m/s, more preferably at least 76.8 m/s, with the upper limit being up to 77.7 m/s. Too low an initial velocity may result in a short carry whereas too high an initial velocity causes the golf ball to fall outside the specifications set by the Rules of Golf.

EXAMPLE

Examples of the invention and comparative examples are given below by way of illustration and not by way of limitation.

Examples 1–2 & Comparative Examples 1–2

Using a core material based on cis-1,4-polybutadiene, a solid core A was produced having a diameter of 36.4 mm, a weight of 29.8 g and a deflection amount of 3.95 mm under an applied load of 100 kg.

Cover materials for intermediate layer or outer layer in pellet form were prepared by mixing ingredients in accordance with the formulation shown in Table 1 at 200° C. on a kneading-type twin-screw extruder, extruding and pelletizing. The cover materials were sequentially injected into a mold in which the solid core had been placed, to form an intermediate layer with a gage of 1.6 mm and an outer layer with a gage of 1.6 mm, giving a three-piece solid golf ball having a diameter of 42.8 mm.

Examples 3–7 & Comparative Examples 3–6

Using a core material based on cis-1,4-polybutadiene, a solid core B was produced having a diameter of 39.7 mm, a weight of 38.0 g and a deflection amount of 3.5 mm under an applied load of 100 kg.

Cover materials for outer layer in pellet form were prepared by mixing ingredients in accordance with the formulation shown in Table 2 at 200° C. on a kneading-type twin-screw extruder, extruding and pelletizing. The cover material was injected into a mold in which the solid core had been placed, to form an outer layer with a gage of 1.55 mm, giving a two-piece solid golf ball having a diameter of 42.8 mm.

Examples 8–9 & Comparative Examples 7–8

Using a core material based on cis-1,4-polybutadiene, a solid core C was produced having a diameter of 36.4 mm, a weight of 29.6 g and a deflection amount of 4.45 mm under an applied load of 100 kg.

Cover materials for intermediate layer or outer layer in pellet form were prepared by mixing ingredients in accordance with the formulation shown in Table 3 at 200° C. on a kneading-type twin-screw extruder, extruding and pelletizing. The cover materials were sequentially injected into a mold in which the solid core had been placed, to form an intermediate layer with a gage of 1.6 mm and an outer layer with a gage of 1.6 mm, giving a three-piece solid golf ball having a diameter of 42.8 mm.

The following characteristics were measured or evaluated for the golf balls obtained in each of the above examples. The results are also shown in Tables 1 to 3.

TABLE 1

| Formulation (pbw) | | | | Example 1 | Example 2 | Comparative Example 1 | Comparative Example 2 |
|---|---|---|---|---|---|---|---|
| Core | | | | solid core A | | | |
| Intermediate layer | Component A | Himilan 1605 | | 35 | 35 | 35 | 35 |
| | | Surlyn 9945 | | 35 | 35 | 35 | 35 |
| | Component B | Dynaron 6100P | | 20 | 25 | | 30 |
| | Component C | Terminally amino-modified SEBC | | 10 | 5 | 30 | |
| | Gage (mm) | | | 1.6 | 1.6 | 1.6 | 1.6 |
| Outer layer | Pandex T-7298 | | | 100 | 100 | 100 | 100 |
| | Titanium dioxide | | | 3 | 3 | 3 | 3 |
| Intermediate layer's MI (dg/min) | | | | 1.7 | 1.7 | 1.3 | 1.8 |
| Intermediate layer's Shore D hardness | | | | 56 | 56 | 56 | 56 |
| Hardness under 100 kg load (mm) | | | | 2.93 | 2.93 | 2.93 | 2.93 |
| Initial velocity (m/s) | | | | 77.1 | 77.1 | 76.9 | 76.9 |
| Durability | | | | ○ | ○ | ○ | X |
| Injection molding of intermediate layer | | | | ○ | ○ | X | ○ |

TABLE 2

| Formulation (pbw) | | | Example 3 | 4 | 5 | Comp Ex. 3 | 4 | Example 6 | 7 | Comp. Ex. 5 | 6 |
|---|---|---|---|---|---|---|---|---|---|---|---|
| Core | | | Solid core B | | | | | | | | |
| Outer | Component A | Himilan 1605 | 45 | 45 | 45 | 45 | 45 | 45 | 45 | 45 |

TABLE 2-continued

| Formulation (pbw) | | | Example 3 | Example 4 | Example 5 | Comp Ex. 3 | Comp Ex. 4 | Example 6 | Example 7 | Comp. Ex. 5 | Comp. Ex. 6 |
|---|---|---|---|---|---|---|---|---|---|---|---|
| layer | | Surlyn 9945 | 15 | 15 | 15 | 15 | 15 | 15 | 15 | 15 | |
| | | Himilan 1706 | 30 | 30 | 30 | 30 | 30 | 30 | 30 | 30 | |
| | | Himilan 1601 | | | | | | | | | 50 |
| | | Himilan 1557 | | | | | | | | | 50 |
| | Component B | Dynaron 6100P | 8 | | | | 10 | 8 | 8 | 8 | |
| | | Pandex T-R3080 | | 8 | | | | | | | |
| | | Primalloy N2800 | | | 8 | | | | | | |
| | Component C | Terminally amino-modified SEBC | 2 | 2 | 2 | 10 | | | | | |
| | | Terminally amino-modified SEBS | | | | | | 2 | | | |
| | | Terminally amino-modified CEBC | | | | | | | 2 | | |
| | Other component | Epoxy-modified random copolymer | | | | | | | | 2 | |
| | Component D | Titanium dioxide | 3 | 2 | 2 | 2 | 2 | 2 | 2 | 2 | 2 |
| Outer layer's MI (dg/min) | | | 1.7 | 1.7 | 1.9 | 1.3 | 1.8 | 1.6 | 1.6 | 1.3 | 2.8 |
| Outer layer's Shore D hardness | | | 60 | 60 | 60 | 60 | 60 | 60 | 60 | 60 | 60 |
| Hardness under 100 kg load (mm) | | | 2.84 | 2.84 | 2.84 | 2.84 | 2.84 | 2.84 | 2.84 | 2.84 | 2.84 |
| Initial velocity (m/s) | | | 77.2 | 77.2 | 77.2 | 77.1 | 77.0 | 77.1 | 77.1 | 77.0 | 76.9 |
| Roughness in polishing step | | | ○ | ○ | ○ | ○ | X | Δ | Δ | X | ○ |
| Injection molding of outer layer | | | ○ | ○ | ○ | X | ○ | ○ | ○ | X | ○ |

TABLE 3

| Formulation (pbw) | | | Example 8 | Example 9 | Comparative Example 7 | Comparative Example 8 |
|---|---|---|---|---|---|---|
| Core | | | solid core C | | | |
| Intermediate layer | Component A | Himilan 1557 | 35 | 35 | 35 | 35 |
| | | Himilan 1555 | 35 | 35 | 35 | 35 |
| | Component B | Primalloy N2800 | 25 | 25 | 30 | 30 |
| | Component C | Terminally amino-modified SEBC | 5 | 5 | | |
| | Component E | NAA222-S | | 10 | | 10 |
| | | Magnesium stearate | 1 | | 1 | 1 |
| | Component F | Calcium hydroxide | | 1.8 | | 1.8 |
| | Component D | Barium Sulfate 300 | 20 | 20 | 20 | 20 |
| | | Gage (mm) | 1.6 | 1.6 | 1.6 | 1.6 |
| Outer layer | | Himilan 1557 | 50 | 50 | 50 | 50 |
| | | Himilan 1605 | 35 | 35 | 35 | 35 |
| | | Himilan 1601 | 15 | 15 | 15 | 15 |
| | | Titanium dioxide | 3 | 3 | 3 | 3 |
| | | Magnesium stearate | 1 | 1 | 1 | 1 |
| Intermediate layer's MI (dg/min) | | | 6 | 2.7 | 5.7 | 5.7 |
| Intermediate layer's Shore D hardness | | | 52 | 52 | 52 | 52 |
| Hardness under 100 kg load (mm) | | | 3.3 | 3.3 | 3.3 | 3.3 |
| Initial velocity (m/s) | | | 77.1 | 77.3 | 76.9 | 77.1 |
| Durability | | | ○ | ○ | X | X |

Himilan 1555: Na ion-neutralized ethylene-methacrylic acid copolymer ionomer by Dupont-Mitsui Polychemicals Co., Ltd.

Himilan 1557: Zn ion-neutralized ethylene-methacrylic acid copolymer ionomer by Dupont-Mitsui Polychemicals Co., Ltd.

Himilan 1601: Na ion-neutralized ethylene-methacrylic acid copolymer ionomer by Dupont-Mitsui Polychemicals Co., Ltd.

Himilan 1605: Na ion-neutralized ethylene-methacrylic acid copolymer ionomer by Dupont-Mitsui Polychemicals Co., Ltd.

Himilan 1706: Zn ion-neutralized ethylene-methacrylic acid copolymer ionomer by Dupont-Mitsui Polychemicals Co., Ltd.

Surlyn 9945: Zn ion-neutralized ethylene-methacrylic acid copolymer ionomer by E.I. DuPont de Nemours and Company.

Dynaron 6100P: C-EB-C block copolymer having crystalline olefin blocks, by JSR Co., Ltd.

Pandex T-7298: thermoplastic polyurethane, by DIC-Bayer Co., Ltd.

Pandex T-R3080: thermoplastic polyurethane, by DIC-Bayer Co., Ltd.

Primalloy N2800: thermoplastic polyester elastomer, by Mitsubishi Chemical Corp.

Terminally amino-modified SEBC: thermoplastic block copolymer of S-EB-C type modified with amino groups only at molecular ends Terminally amino-modified SEBS: thermoplastic block copolymer of S-EB-S type modified with amino groups only at molecular ends Terminally amino-modified CEBC: thermoplastic block copolymer of C-EB-C type modified with amino groups only at molecular ends Epoxy-modified random copolymer: ethylene-glycidyl methacrylate-acrylic ester random copolymer Barium Sulfate 300: precipitated barium sulfate by Sakai Chemical Industry Co., Ltd.

NAA222-S: behenic acid by NOF Corp.

MI:

A melt index (dg/min) was measured at a test temperature of 190° C. and a test load of 21.2 N (2.16 kgf) according to JIS K-6760

Shore D Hardness:

Measured according to ASTM D-2240.

Hardness Under 100 kg Load:

A deflection amount (mm) of a golf ball when a load of 100 kg is applied.

Initial Velocity:

Measured (in unit m/s) using the same type of initial velocity instrument as approved by the United States Golf Association (USGA), and in accordance with USGA rules.

Durability:

A golf ball was repeatedly 100 times hit against a metal plate at an incident speed of 50 m/s before it was observed for cracked state.

○: not cracked
χ: cracked

Injection Molding:

When a cover material was injection molded over a core, moldability was rated according to the following criterion.

○: no weld marks or sink marks
χ: weld marks and sink marks

Roughness in Polishing Step:

After a cover material was injection molded, gate fins were polished off. Moldability was rated according to the following criterion.

○: neither delaminated nor roughened
Δ: somewhat delaminated and roughened
χ: markedly delaminated and roughened There has been described a golf ball having improved rebound, a soft feel upon impact, good durability and good moldability.

Japanese Patent Application No. 2003-182754 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a core and a cover of one or more layers enclosing the core, wherein at least one layer which constitutes said cover is formed primarily of a mixture comprising (A) an ionomer resin composition, (B) a thermoplastic elastomer selected from a thermoplastic polyester elastomer, thermoplastic block copolymer and thermoplastic polyurethane, and (C) a thermoplastic block copolymer terminated with a functional group capable of reacting with the ionomer resin, in such a proportion as to provide a A/(B+C) weight ratio between 50/50 and 98/2 and a B/C weight ratio between 9/1 and 1/1, wherein the functional group of the thermoplastic block copolymer (C) is selected from the group consisting of amino, acid anhydride and epoxy groups, and wherein the thermoplastic elastomer (B) has no functional groups capable of reacting with ionomer resins.

2. The golf ball of claim 1, wherein said mixture further comprises (D) an inorganic filler having no reactivity with the ionomer resin in such a proportion as to provide a (A+B+C)/D weight ratio between 100/10 and 100/30.

3. A golf ball comprising a core and a cover of one or more layers enclosing the core, wherein at least one layer which constitutes said cover is formed primarily of a mixture comprising (A) an ionomer resin composition, (B) a thermoplastic elastomer selected from a thermoplastic polyester elastomer, thermoplastic block copolymer and thermoplastic polyurethane, and (C) a thermoplastic block copolymer terminated with a functional group capable of reacting with the ionomer resin, in such a proportion as to provide a A/(B+C) weight ratio between 50/50 and 98/2 and a B/C weight ratio between 9/1 and 1/1, wherein said mixture further comprises (E) an organic acid of 18 to 40 carbon atoms or a derivative thereof and (F) an inorganic filler capable of reacting with acid groups in component (A) and/or (E) in such a proportion as to provide a (A+B+C)/E weight ratio between 100/5 and 100/20 and a (A+B+C)/F weight ratio between 100/0.1 and 100/10.

4. A golf ball comprising a core and a cover of one or more layers enclosing the core, wherein at least one layer which constitutes said cover is formed primarily of a mixture comprising (A) an ionomer resin composition, (B) a thermoplastic elastomer selected from a thermoplastic polyester elastomer, thermoplastic block copolymer and thermoplastic polyurethane, and (C) a thermoplastic block copolymer terminated with a functional group capable of reacting with the ionomer resin, in such a proportion as to provide a A/(B+C) weight ratio between 50/50 and 98/2 and a B/C weight ratio between 9/1 and 1/1, wherein said mixture further comprises (D) an inorganic filler having no reactivity with the ionomer resin in such a proportion as to provide a (A+B+C)/D weight ratio between 100/10 and 100/30, and wherein said mixture further comprises (E) an organic acid of 18 to 40 carbon atoms or a derivative thereof and (F) another inorganic filler capable of reacting with acid groups in component (A) and/or (E) in such a proportion as to provide a (A+B+C)/E weight ratio between 100/5 and 100/20 and a (A+B+C)/F weight ratio between 100/0.1 and 100/10.

5. The golf ball of claim 1, wherein said thermoplastic block copolymer terminated with a functional group capable of reacting with the ionomer resin (C) is a thermoplastic block copolymer in which only end blocks are modified with functional groups.

* * * * *